US006986527B2

(12) United States Patent
Carver

(10) Patent No.: US 6,986,527 B2
(45) Date of Patent: Jan. 17, 2006

(54) FOLDING CARRIER AND SHELTER FOR USE IN ICE FISHING AND HUNTING

(75) Inventor: Steven R. Carver, 2641 Sparta Dr., Troy, MI (US) 48083

(73) Assignee: Steven R. Carver, Troy, MI (US)

( * ) Notice: Subject to any disclaimer, the term of this patent is extended or adjusted under 35 U.S.C. 154(b) by 97 days.

(21) Appl. No.: 10/804,441

(22) Filed: Mar. 19, 2004

(65) Prior Publication Data

US 2005/0206102 A1 Sep. 22, 2005

(51) Int. Cl.
*B62B 11/00* (2006.01)
(52) U.S. Cl. ....................................... 280/651; 280/652
(58) Field of Classification Search ................ 280/651, 280/652
See application file for complete search history.

(56) References Cited

U.S. PATENT DOCUMENTS 3,504,924 A 4/1970 Nesbit
3,582,102 A * 6/1971 Bewick ................. 280/33.998
3,807,750 A * 4/1974 Brown ........................ 280/35
3,840,242 A * 10/1974 Craig et al. ............ 280/33.996
3,840,243 A * 10/1974 Rheinhart et al. .......... 280/651
3,908,562 A * 9/1975 Wittschen ................ 280/79.11
4,730,569 A 3/1988 Colson
4,918,853 A 4/1990 Bascom et al.
5,282,520 A 2/1994 Walker
5,295,556 A 3/1994 Mullin
5,575,490 A 11/1996 Simpson, Jr.
5,577,746 A 11/1996 Britton
5,897,131 A 4/1999 Brown et al.
6,161,850 A 12/2000 James et al.
6,408,962 B1 6/2002 Ryckman

OTHER PUBLICATIONS

Cabela's 2003 Winter Master Catalog, "Fold-A-Sped", p. 101.
Cabela's 2003 Winter Master Catalog, "Jet Sled", p 153.

* cited by examiner

*Primary Examiner*—Bryan Fischmann
*Assistant Examiner*—Cynthia F. Collado
(74) *Attorney, Agent, or Firm*—MacMillan, Sobanski & Todd, LLC

(57) ABSTRACT

A foldable transport device includes a center frame, side frames each pivotably connected to the center frame at opposite sides thereof for angular movement to a folded position where the side frames folded over the center frame and to an unfolded position; and cross members releasably secured to and extending between the side frames when the frames are unfolded. A cover, supported on the frames, may be used to provide a sheltered a space within the unfolded frame. The side frames function as runners in the unfolded position and have wheels for use in the folded position.

20 Claims, 7 Drawing Sheets

FOLDING CARRIER AND SHELTER FOR USE IN ICE FISHING AND HUNTING

BACKGROUND OF THE INVENTION

The invention relates to a combination carrier and campsite shelter that functions as a sled for transporting a person and equipment, a dolly for carrying equipment on wheels, and an outdoor shelter of the type used when hunting game and ice fishing. The device is readily towed by a person or a vehicle, and provides a seat for use in transit and at a campsite.

Ice fishers and hunters often fish and hunt in remote locations that are not accessible by motor vehicle. Transporting heavy equipment is inconvenient and laborious especially on ice and snow covered ground. It is desirable when traveling on foot in relatively remote areas under such conditions to use a carrier supported on wheels or runners capable of carrying equipment. The carrier, which transports a person's equipment for hunting and fishing, preferably should be able to fold to a compact size for easier handling when not in use.

Folding, ground-supported, manually transportable carriers to assist hunters and fishers with equipment are known and disclosed in U.S. Pat. Nos. 3,504,924; 5,295,556; and 5,897,131. It is desirable that such structures be easy to fold and unfold; yet be robust and rugged when assembled. The carrier should be lightweight to facilitate load carrying and should be able to be towed by a vehicle and pushed or drawn manually.

Preferably, a carrier would provide shelter from cold and windy conditions usually present during ice fishing and hunting seasons. The carrier should provide a seat for use during transport and at a campsite. The device should be easy to convert from use as a sled, a wheeled carrier, and a shelter.

SUMMARY OF THE INVENTION

The invention relates to a folding ground supported carrier that is easily converted to a covered shelter having a seat. The device can stand vertically on a stabilized support and is enclosed by a cover supported on a frame assembly. The carrier can be tipped over for use as a sled and, in that position can be hitched to a vehicle, such as an all-terrain vehicle. The device can be folded and supported on wheels for use as a carrier, and hitched in the folded condition to a vehicle. Due to its tubular frame construction and light weight, the device can be readily pulled or pushed by a person without mechanical assistance.

In realizing these and other advantages, a foldable, transport device according to this invention includes a center frame, side frames each pivotably connected to the center frame at opposite sides thereof for angular movement to a folded position where the side frames are folded over the center frame, and to an unfolded position; and cross members secured to and extending between the side frames when the frames are unfolded. A cover, supported on the frames, may be used to provide a sheltered space within the unfolded frame.

Various objects and advantages of this invention will become apparent to those skilled in the art from the following detailed description of the preferred embodiment, when read in light of the accompanying drawings.

BRIEF DESCRIPTION OF THE DRAWINGS

These and other advantages of the present invention will become apparent to those skilled in the art from the following detailed description of a preferred embodiment when considered in the light of the accompanying drawings in which.

DETAILED DESCRIPTION OF THE PREFERRED EMBODIMENT

Figure 1:
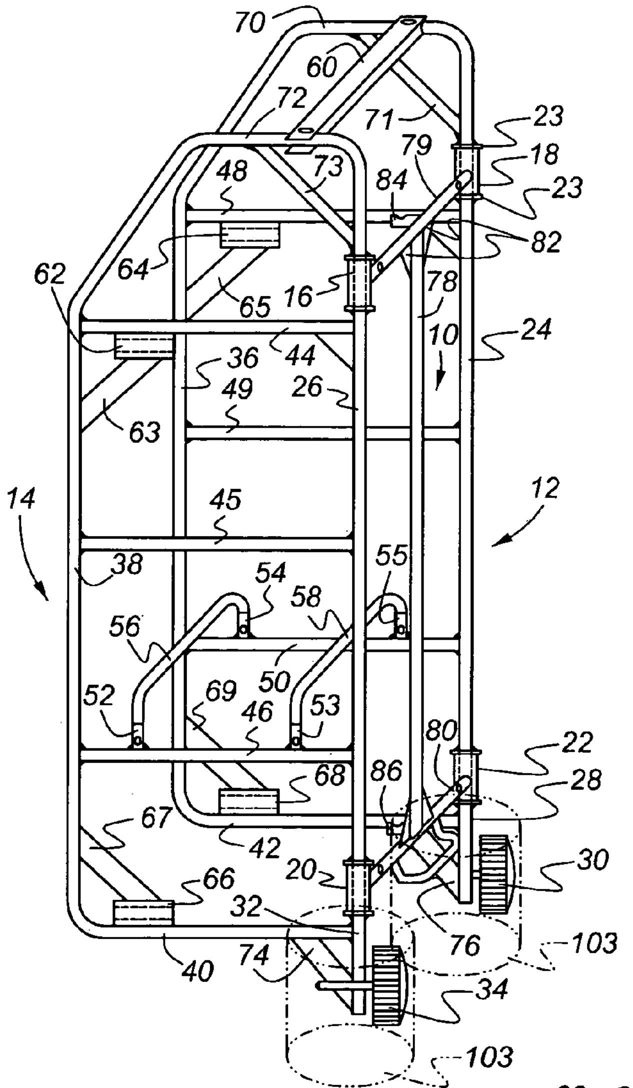
FIG. 1 is an isometric side view of a transport device according to the present invention with the frame unfolded and positioned vertically.
Figure 2:
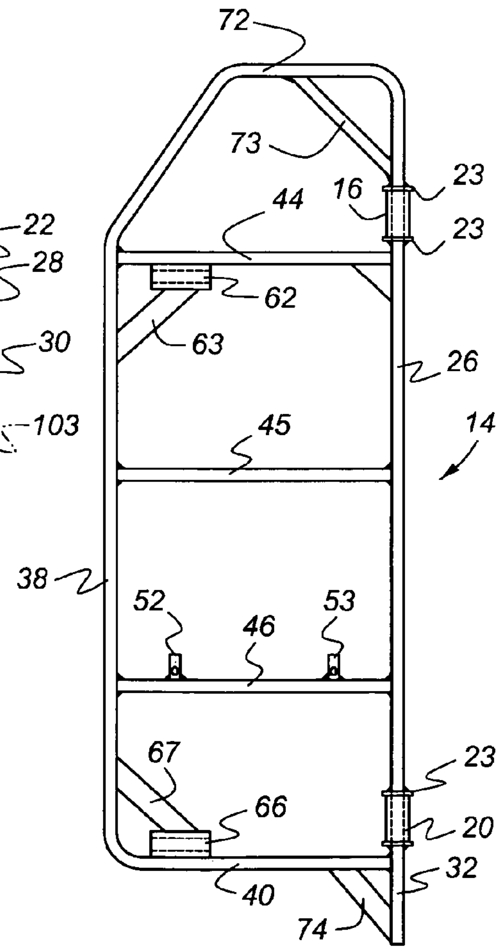
FIG. 2 is a side view of one of the side frames shown in FIG. 1.
Figure 4:
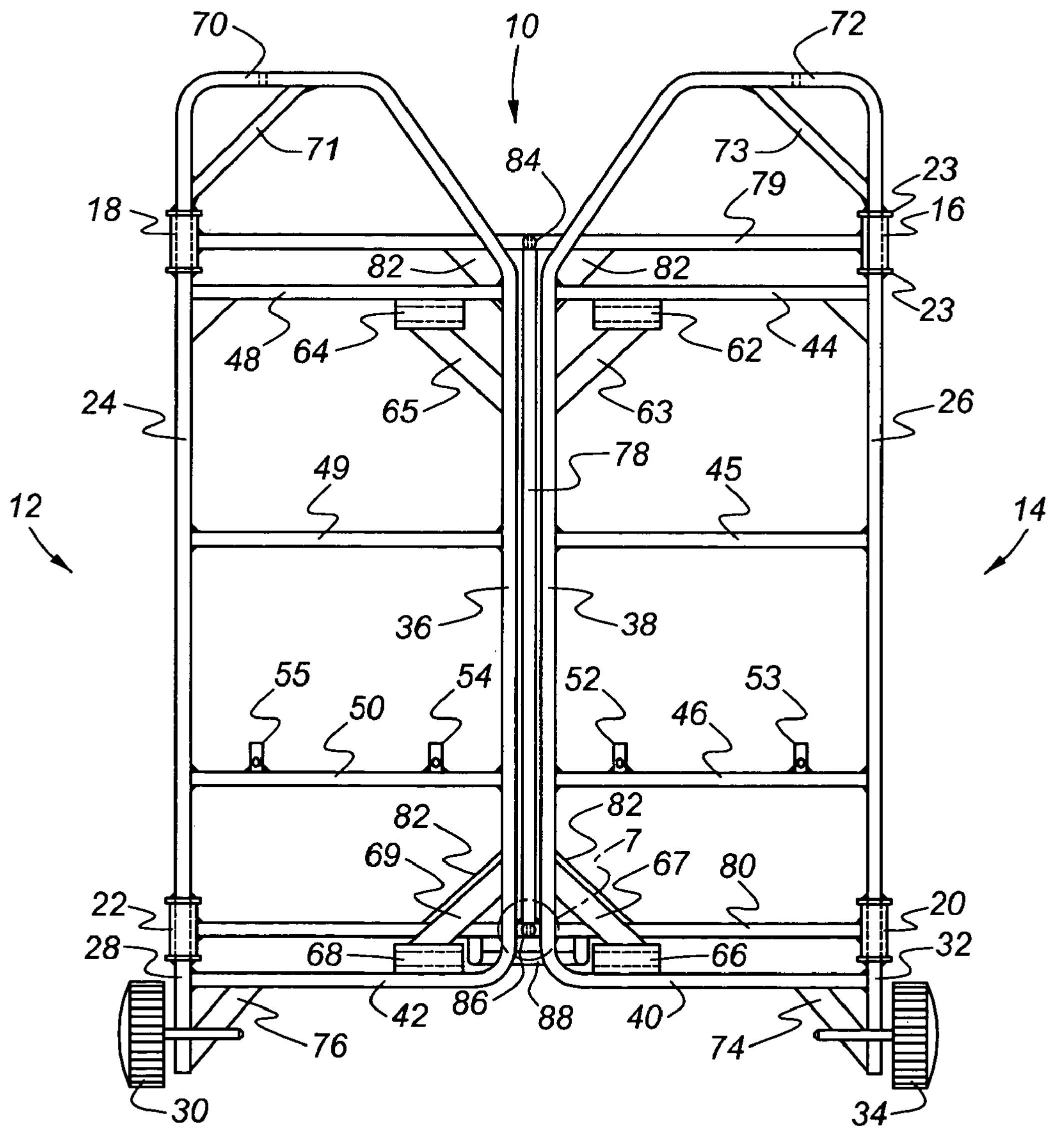
FIG. 4 is a front view of the device shown in FIG. 1 showing the side frames folded.

Referring now to the drawings, there is illustrated in FIG. 1 a device supported on wheels or runners for transporting a person and equipment and providing a personal shelter of the type used when hunting or fishing. The device has a structural frame assembly that includes a center frame 10 and two side frames 12, 14, which are supported on the center frame 10 for pivotal movement between an expanded or unfolded position, as shown in FIG. 1, and a retracted or folded position, as shown in FIG. 4. The frames 10, 12, 14 extend longitudinally between a first or upper end and a second or lower end in the upright position of the device shown in FIGS. 1, 2, 4 and 10.

The side frames 12, 14 are formed of bent cylindrical tubing having a circular cross section. A rail 24 of the side frame 12 passes through upper and lower pivot tubes 18 and 22; a rail 26 of the side frame 14 passes through upper and lower pivot tubes 16 and 20. The pivot tubes are welded to washers 23 located above and below each pivot tube. The rail 24 includes a leg 28 at the second end that extends below the pivot tube 22 and supports a wheel 30 on an axle for rotation on the leg 28. Similarly, the rail 26 includes a leg 32 at the second end that extends below the pivot tube 20 and supports a wheel 34 on an axle for rotation on the leg 32. The side frame 12 includes a lower rail 36, and the side frame 14 includes a lower rail 38. The lower rail 38 of the side frame 14 terminates in a transverse strut 40, which is welded to the upper rail 26 at the leg 32. The lower rail 36 of the side frame 12 also terminates in a transverse strut 42, which is welded to the upper rail 24 at the leg 28. The side frame 14 includes struts 44, 45, 46, arranged parallel to the strut 40 and welded to the rails 26 and 38. Similarly, the side frame 12 includes struts 48, 49, 50, arranged parallel to the strut 42 and welded at each end to the rails 24 and 36.

At the first end of the device, the side frame 12 includes a forward strut 70, extending between the rails 24 and 36 and being stabilized and secured to the rail 24 by a strut 71. The strut 70 extends transversely from the upper end of the rail 24 and then angles downwardly to join the upper end of the rail 36. The rail 24, the forward strut 70, the rail 36 and the strut 42 can be formed from a single piece of tubing. The side rail 14 includes a forward strut 72, extending between the rails 26 and 38 and being stabilized and secured to the rail 26 by a strut 73. The strut 72 extends transversely from the upper end of the rail 26 and then angles downwardly to join the upper end of the rail 38. The rail 26, the forward strut 72, the rail 38 and the strut 40 can be formed from a single piece of tubing. The lower legs 32, 28 are each stabilized by a gusset 74, 76 respectively. The strut 46 carries two posts 52, 53, welded to the strut 46 and extending in a forward or upward direction. Similarly, the strut 50 carries two posts 54, 55, welded to the strut 50, extending in a forward or upward direction, and aligned, respectively, with the posts 52, 53. When the frame assembly is unfolded and standing upright for use as a shelter, the position shown in FIG. 1, the side rails 12, 14 are interconnected by tubular arms 56, 58, which engage the posts 52 through 55 on the struts 46, 50. The upper struts 70, 72 of the side frames 12, 14 are interconnected also by a bar 60 at the first or upper end of the device.

The strut 44 carries a tube 62, secured by a weld to the strut 44 and by a gusset 63 to the rail 38. The strut 48 carries a tube 64, secured by a weld to the strut 48 and by a gusset 65 to the rail 36. The lower struts 40, 42, have secured to them tubes 66, 68, respectively, which are secured to the associated rails 38 or 36 by a gusset 67 or 69, respectively. When the frame assembly is unfolded and resting on the rails 36, 38 for use as a sled, the position shown in FIG. 5, the side rails 12, 14 are interconnected by inserting one of the tubular arms 56 in the forward tubes 62, 64, and by inserting the other tubular arm 58 in the rear tubes 66, 68.

Figure 3C:
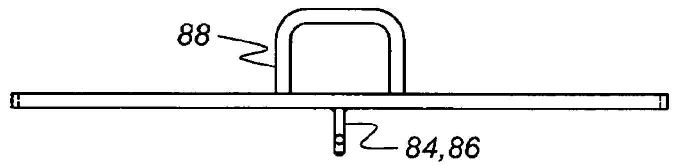
FIGS. 3A, 3B and 3C are front, side and top views, respectively, of the center frame shown in FIG. 1.
Figure 3B:
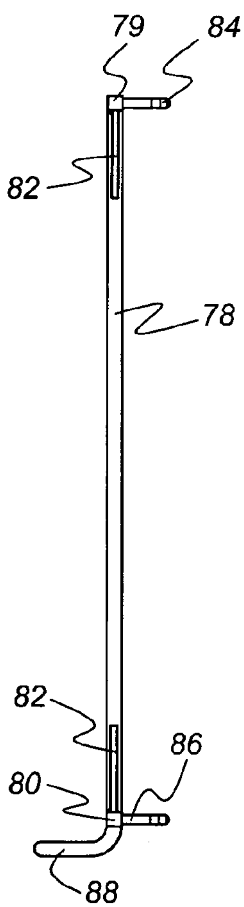
Figure 3A:
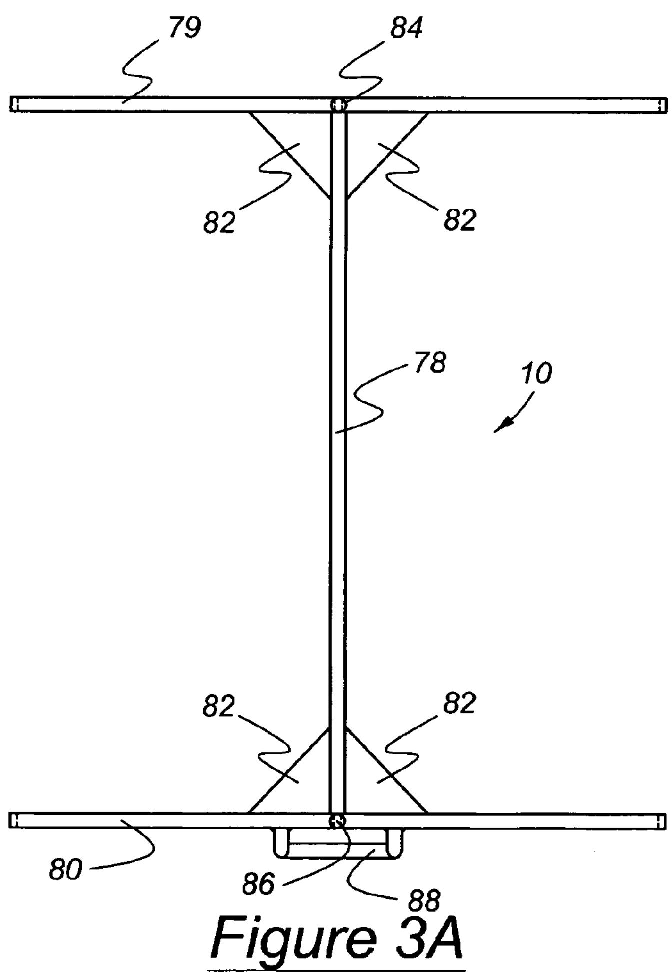

Turning now to FIGS. 3A–3C, the center frame 10 includes a longitudinal center rail 78, an upper transverse rail 79 and a lower transverse rail 80. Preferably each of the rails 78 through 80 is formed of square tubing, and the transverse rails 79, 80 are secured by welds to the center rail 78, where the attachment is stabilized and strengthened by gusset plates 82. The transverse rail 79 includes a post 84, aligned with the rail 78; the transverse rail 80 also supports a post 86, which is aligned with the post 84. The rail 80 also carries a handle 88 that extends away from the rail 80 in the opposite direction from the location of the post 86. Each axial end of the transverse rail 79 is welded to one of the pivot tubes 16, 18. Opposite axial ends of the transverse rail 80 are welded to the tubes 20, 22.

Figure 7:
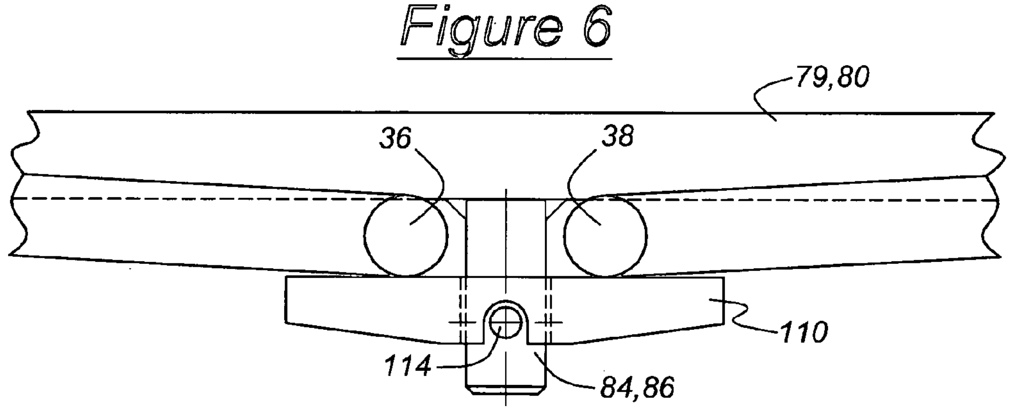
FIG. 7 is a fragmentary top view of the central portion of the device at an area 7 shown in FIG. 4.
Figure 8:
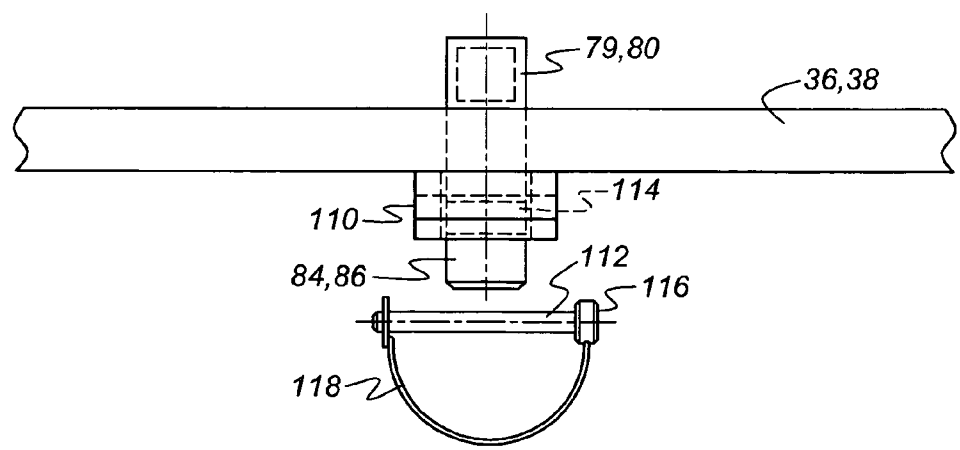
FIG. 8 is a fragmentary side view of the central portion shown in FIG. 7.

FIGS. 7 and 8 illustrate an assembly for securing the side frames in the folded position at the forward and rearward posts 84, 86. When the frame assembly is folded, the side frames 12, 14 are secured against movement relative to the center frame 10 by placing a pair of plates 110 over the side frames such that each of the plates overlaps the side frames 12, 14. The plate 110 has a hole through which one of the posts 84 or 86 is inserted, thereby bringing the plate into contact with the folded side frames. Each post 84, 86 is formed with a transverse hole 114. Then a D-pin 112 is inserted through the lateral hole 114 formed in each post. The D-pin 112 has a head 116 that carries a pivoting strap 118. When the D-pin 112 is inserted in the hole 114, the strap 118 is passed over the end of the shank of the D-pin 112 that is opposite the head 116. This secures the D-pin 112 in position on the post 84, 86, retains the plate 110 in its position, and prevents the side frames from pivoting relative to the center frame 10.

Figure 9:
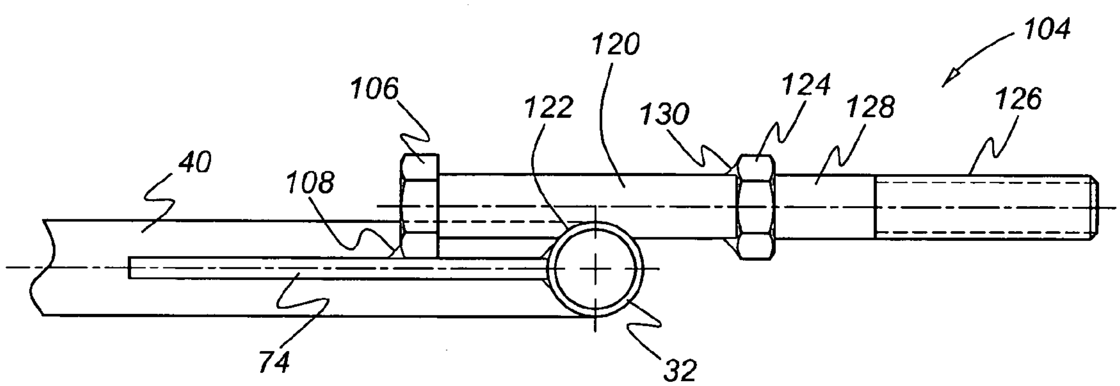
FIG. 9 is a rear view of one of the wheel axles of the device shown in FIG. 1.

FIG. 9 shows the details of the attachment of a typical wheel axle 104 to the leg 32, the gusset 74 and the strut 40. A head 106 of the axle 104 is welded at 108 to the gusset 74 and the strut 40. A shank 120 of the axle 104 is relieved locally at 122 to conform to the contour of the leg 32 and is welded to the leg. A jam nut 124, fitted over threads 126 and a shank portion 128, is welded to the axle at 130. The wheel 34 is supported for rotation on the shank portion 128 and is secured to the axle 104 by a threaded nut (not shown) engaging the threads 126.

In operation, the frame assembly is folded into the position shown in FIG. 4 by removing the bar 60 and the arms 58, 56 from the frames. The side frames 12, 14 pivot with respect to the center frame 10 due to rotation of the rails 24, 26 within the pivot tubes 16, 18, 20, 22, such that the side frames 12, 14 lie across the center frame 10 on the side from which the posts 84 and 86 are located. When the frame is folded, the wheels 30, 34 become aligned with the rails 24, 26 so that the device can be towed or pushed while supported on the wheels.

Figure 5:
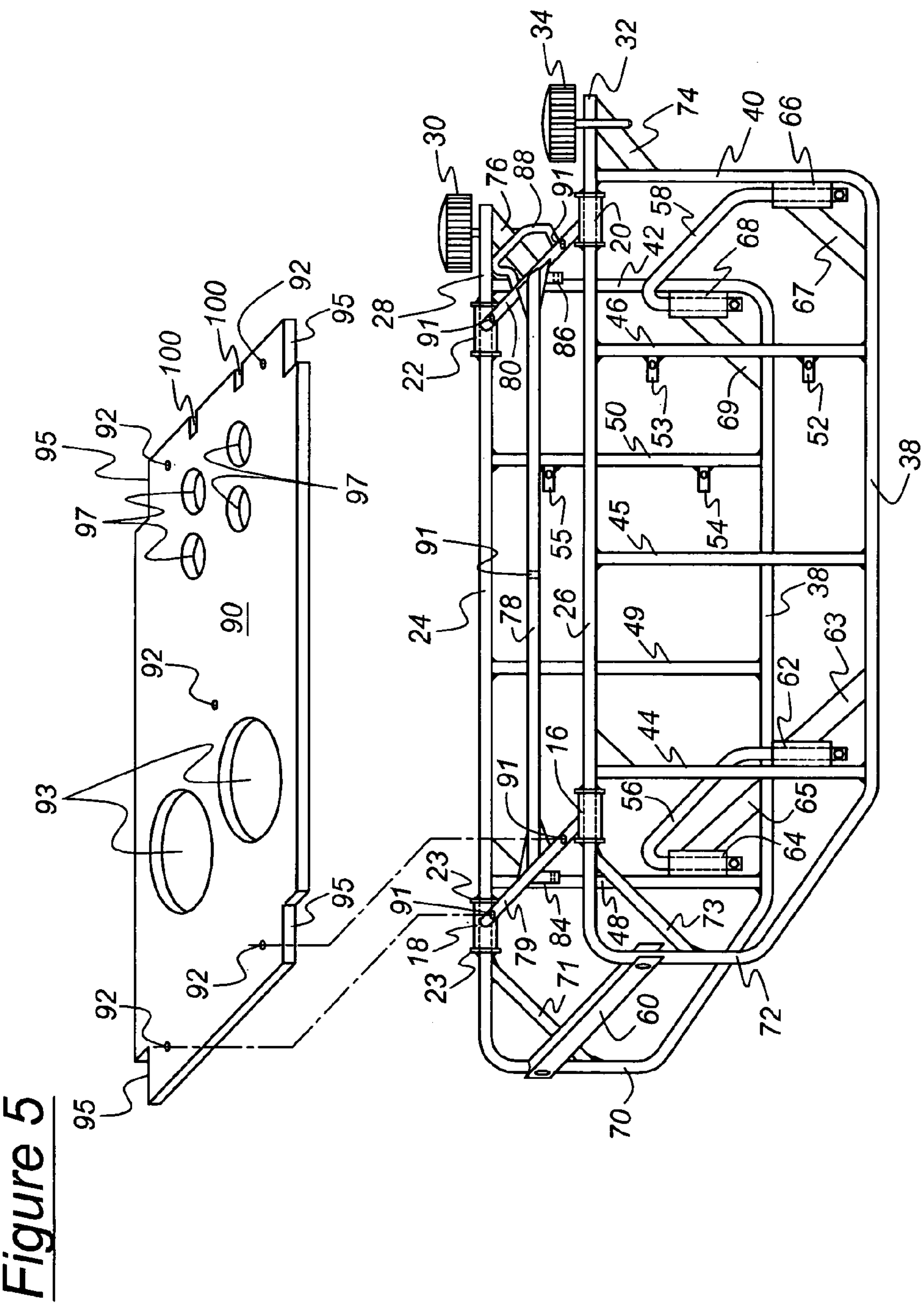
FIG. 5 is an isometric side view of the device shown in FIG. 1 with the frame unfolded and positioned horizontally and including a platform.
Figure 6:
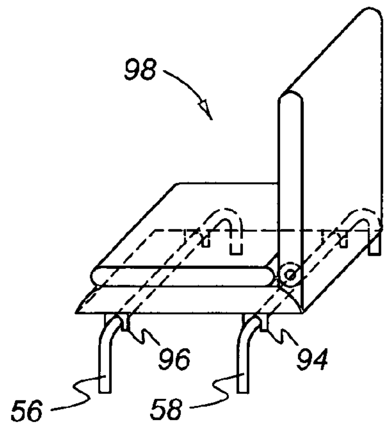
FIG. 6 is side view of a seat for use with the device shown in FIG. 5.

The frame assembly can be tipped over from the vertical position of FIG. 1 to the horizontal position of FIG. 5 for use as a sled supported on rails 36, 38. When the frame assembly is in the position of FIG. 5, the arms 56, 58 will have been removed from their engagement with the posts 52, 54 and 53, 55 and are relocated so that one arm 56 is inserted in the tubes 62, 64 and the other arm 58 is inserted the tubes 66, 68. The first or upper end of the device is now a forward end and the second or lower end is now a rearward end. A platform 90 can be supported on the rails 24, 26 and 78 and on transverse rails 79, 80. Attachment holes 91 are provided at opposite ends of the transverse rails 79, 80 and at the midpoint of the center rail 78 of the center frame 10. The platform 90 is secured by removable fasteners (not shown) that extend through corresponding attachment holes 92 in the platform and the attachment holes 91 in the rails. The platform 90 is formed with two larger holes 93 for carrying two large buckets (not shown), corners 95 that are relieved to accommodate the pivot tubes 16, 18, 20, 22, and slots 100 that accept the arms of the handle 88. The platform 90 has four smaller holes 97 to receive clamping spools 94, 96 located on the underside of a seat 98, shown in FIG. 6, which is supported on the upper surface of the platform. The clamping spools 94, 96 are secured to the platform 90 by suitable attachments (not shown) to releasable secure the seat 98 on the platform. A suitable seat 98 for use with the device is the folding stadium seat available commercially from MATPRO having product number Q23-1164.

Figure 10:
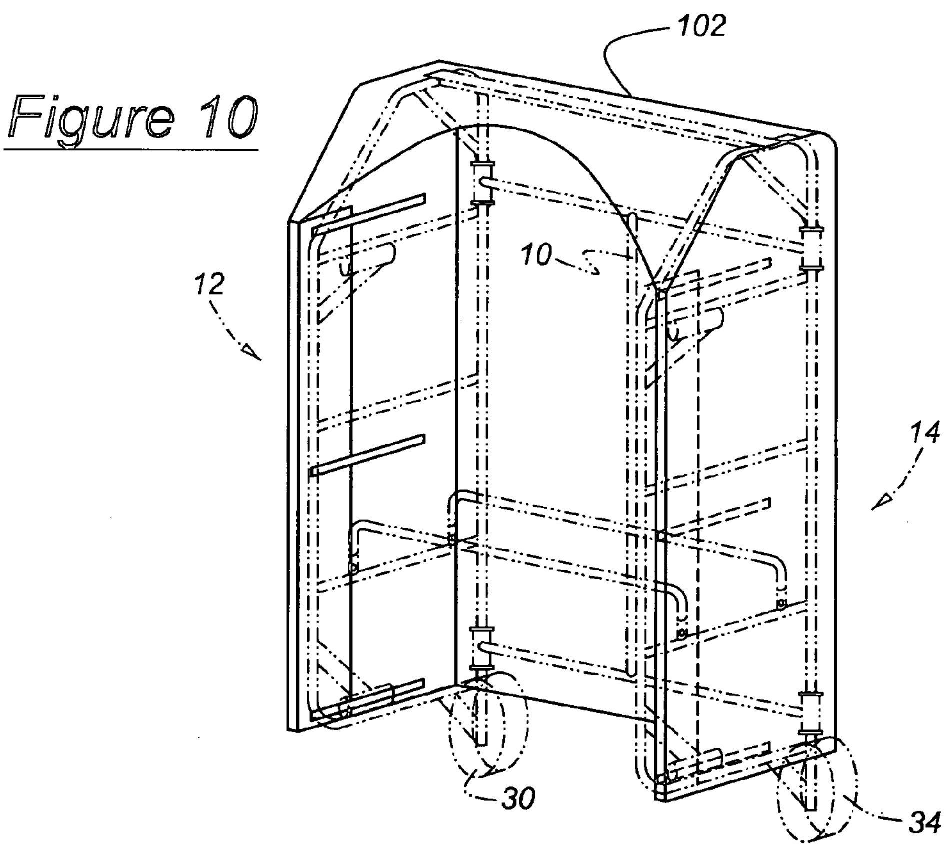
FIG. 10 is an isometric view of a cover for enclosing the frame of the device shown in FIG. 1.

The frame assembly can also be used unfolded and upright as a shelter by placing a cover, such as a fitted cover 102 of FIG. 10, over the top, sides and back of the unfolded frame assembly, as shown in FIG. 1. Preferably holes 103 are dug in the ground or drilled in ice to receive the wheels 30, 34 so that the struts 40, 42 are supported on the surface of the ice or ground. Then the legs 28, 32 and wheels 30, 34 are placed in the holes to stabilize the covered frame assembly. The cross members 56, 58 are used to support the chair 98, whose clamping spools 94, 96 engage the cross members (FIG. 6), with the cross members in the position shown in FIG. 1.

Figure 11:
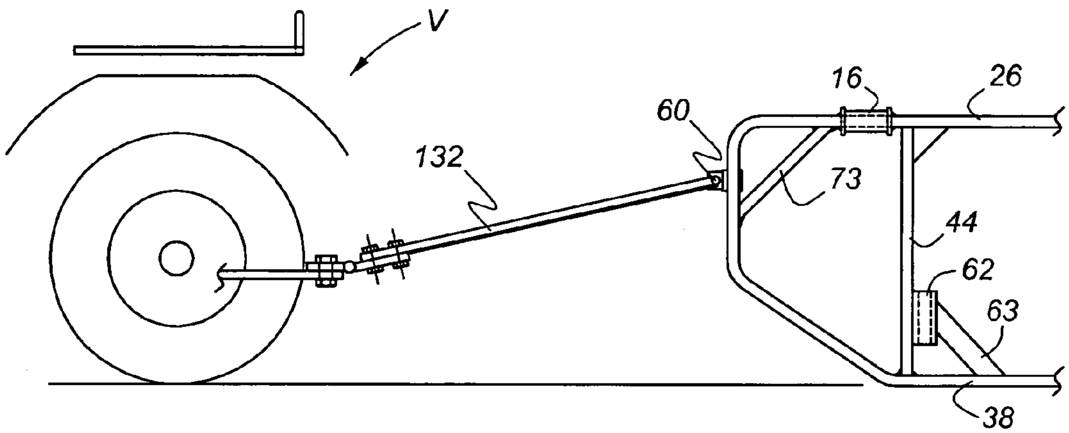
FIG. 11 is a fragmentary side view showing the device of Figure in a horizontal position supported on rails for use as a sled and hitched to a vehicle.
Figure 12:
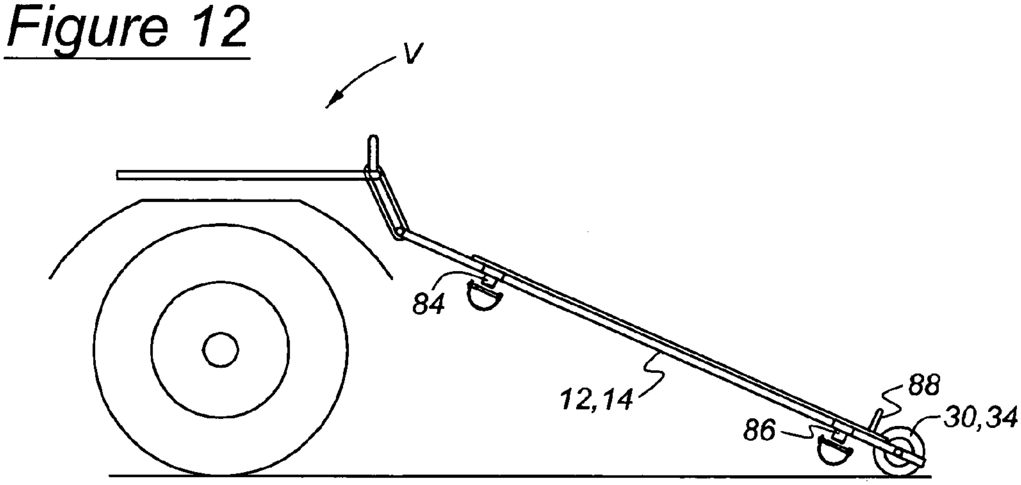
FIG. 12 is a fragmentary side view of the device of FIG. 1 in the folded condition supported on wheels and hitched to a vehicle.

FIG. 11 shows the transport device tipped over for use as a sled and hitched at its forward end by an attachment 132 on the bar 60 to a vehicle V, such as an all-terrain vehicle. FIG. 12 shows the device folded, supported on its wheels 30, 34 for use as a dolly, and hitched to the vehicle V. Due to its tubular frame construction and light weight, the device can be readily pulled or pushed by a person without powered assistance.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A foldable transport device, comprising:

a center frame;

a pair of side frames, each said side frame being pivotably connected to said center frame at opposite sides thereof for angular movement between a folded position wherein said side frames are folded over said center frame and an unfolded position wherein said side frames extend outwardly from said center frame, said center and side frames extending longitudinally from a first end to a second end of the device; and at least one arm releasably secured to and extending between said side frames for maintaining said side frames in the unfolded position.

2. The device according to claim 1 including a cover supported on said side frames and said center frame and at least partially enclosing a space bounded by said side and center frames when said side frames are in the unfolded position and said center and side frames are oriented generally vertically with said first end above said second end.

3. The device according to claim 1 including a seat supported on said at least one arm when said side frames are in the unfolded position and said center and side frames are oriented generally vertically with said first end above said second end.

4. The device according to claim 3 including another arm releasably secured to and extending between said side frames, said seat being supported on said another arm.

5. The device according to claim 1 wherein each said side frame further comprises:

first and second axially directed parallel rails; and at least two struts transversely extending secured to said rails and interconnecting said rails at axially spaced locations, said at least one arm being releasably secured to one of said struts on each of said side frames for maintaining said side frames in the unfolded position.

6. The device according to claim 5 including a post secured to said one strut on each said side frame, said at least one arm having tubular portions sized to fit over said posts.

7. The device according to claim 1 including a sleeve secured to said one strut on each said side frame, said sleeves being sized to receive said at least one arm.

8. The device according to claim 1 including a pair of wheels each rotatably attached to an associated one of said side frames for engaging a support surface when said side frames are in the folded position.

9. The device according to claim 1 further comprising:

said center frame including a central rail, an upper rail secured to and extending transversely to said central rail at said first end of the device, and a lower rail secured to and extending transversely to said central rail at said second end of the device;

a pair of mutually aligned first pivot tubes, each said first pivot tube being secured to a first end of an associated one of said upper and lower rails, one of said side frames being supported by said first pivot tubes for said angular movement; and a pair of mutually aligned second pivot tubes, each said second pivot tube being secured to a second end of an associated one of said upper and lower rails, another one of said side frames being supported by said second pivot tubes for said angular movement.

10. The device according to claim 1 further comprising:

a post secured to said central frame and extending therefrom, said post having a lateral hole formed therein;

a plate having an opening formed therein receiving said post; and a pin received in said lateral hole and securing said side frames in the folded position between said central frame and said plate.

11. The device according to claim 1 including a load carrying platform supported by said center frame and said side frames.

12. The device according to claim 11 including a seat resting on said platform.

13. The device according to claim 1 including a handle extending from said center frame.

14. A foldable transport device providing shelter, comprising:

a center frame;

a pair of side frames, each said side frame being pivotably connected to said center frame at opposite sides thereof for angular movement between a folded position wherein said side frames are folded over said center frame and to an unfolded position wherein said side frames extend outwardly from said center frame, said center and side frames extending longitudinally from a first end to a second end of the device;

a pair of arms each releasably secured to and extending between said side frames for maintaining said side frames in the unfolded position; and a removable fitted cover conforming to and supported on said frames, said cover at least partially enclosing a space bounded by said frames when said side frames are in the unfolded position.

15. The device according to claim 14 including a pair of wheels, each said wheel being rotatably attached to an associated one of said side frames whereby said wheels engage a support surface when said side frames are in the folded position.

16. The device according to claim 14 including a seat releasably supported on said arms.

17. The device according to claim 16 including a platform supported by said center frame and said side frames and having at least one hole formed therein for releasably retaining said seat when said seat is released from said arms.

18. A foldable transport device, comprising:

a center frame including a central rail, an upper rail secured to and extending transverse to said central rail, and a lower rail secured to and extending transverse to said central rail and spaced from said upper rail;

a pair of side frames, each said side frame being pivotably connected to said center frame at opposite sides thereof for angular movement between a folded position wherein said side frames are folded over said center frame and to an unfolded position wherein said side frames extend outwardly from said center frame, said center and side frames extending longitudinally from a first end to a second end of the device; and a pair of arms each releasably secured to and extending between said side frames for selectively maintaining said side frames in the unfolded position.

19. The device according to claim 18 further comprising:

a pair of posts secured to said central frame and extending therefrom, each said post having a lateral hole formed therein;

a pair of plates each having an opening formed therein receiving one of said posts;

a pair of pins, each said pin received in said lateral hole of an associated one of said posts and securing said side frames in the folded position between said central frame and said plates; and a pair of wheels, each said wheel being rotatably attached to an associated one of said side frames whereby said wheels engage a support surface when said side frames are in the folded position.

20. The device according to claim 18 including a seat having a plurality of clamping spools for releasably engaging said arms, and a platform supported by said center frame and said side frames, said platform having a plurality of holes formed therein for releasably receiving said clamping spools when said clamping spools are released from said arms.

* * * * *